United States Patent [19]
Vrana

[11] 4,117,992
[45] Oct. 3, 1978

[54] VERTICAL LIFT DEVICE

[76] Inventor: Charles K. Vrana, P.O. Box 686, La Belle, Fla. 33935

[21] Appl. No.: 736,444

[22] Filed: Oct. 28, 1976

[51] Int. Cl.² ............................................. B64C 29/02
[52] U.S. Cl. .................................. 244/23 C; 244/12.2
[58] Field of Search .................. 244/12.2, 23 C, 73 B, 244/73 C

[56] References Cited

U.S. PATENT DOCUMENTS

| | | | |
|---|---|---|---|
| 3,410,507 | 11/1968 | Moller | 244/23 C |
| 3,785,592 | 1/1974 | Kerruish | 244/23 C X |

*Primary Examiner*—Barry L. Kelmachter
*Attorney, Agent, or Firm*—Alfred E. Wilson

[57] ABSTRACT

A vertical lift device comprised of a generally vertically disposed cylindrical tunnel, open at the top and bottom ends, with a driven propeller axially mounted at the open top end to direct a stream of air downwardly through the tunnel. A first portion of the stream of air is spirally directed outwardly through a peripheral portion of the open bottom end to create first lift forces for the device by using jet stream action. A second portion of the air stream is directed downwardly through a central axially disposed tube in the cylindrical tunnel to twin fans which redirect the second portion upwardly into a truncated cone, surrounding the central tube, to increase the pressure against the inner wall surface of the cone to create second lift forces.

9 Claims, 4 Drawing Figures

VERTICAL LIFT DEVICE

FIELD OF THE INVENTION

This invention pertains to a lift device and more particularly to a vertical lift device for use in combination with a generally conventional type of heavier than air aircraft, or for use as a personal lift means.

OBJECTS AND ADVANTAGES OF THE PRESENT INVENTION

One of the principal objects of the present invention is to provide a vertical lift device which may be used in combination with a generally conventional type of heavier than air aircraft to assist the aircraft in taking off from the ground by substantially shortening the take-off run thereof.

Another object of this invention is to provide a vertical lift device which may be applied to a personal lift vehicle, and which device may also be swung into various angles to horizontal position for forward flight.

A further object of the present invention is to provide a vertical lift device utilizing a main driven propeller to provide a strong spiral downdraft, a first portion of which is utilized to provide first lift forces in the form of a downwardly directed jet stream of air and a second portion which is directed to twin fans which redirect said second portion upwardly against the inner wall surface of a truncated cone to create second lift forces.

DESCRIPTION OF A PREFERRED EMBODIMENT OF THE VERTICAL LIFT DEVICE

Figure 1:
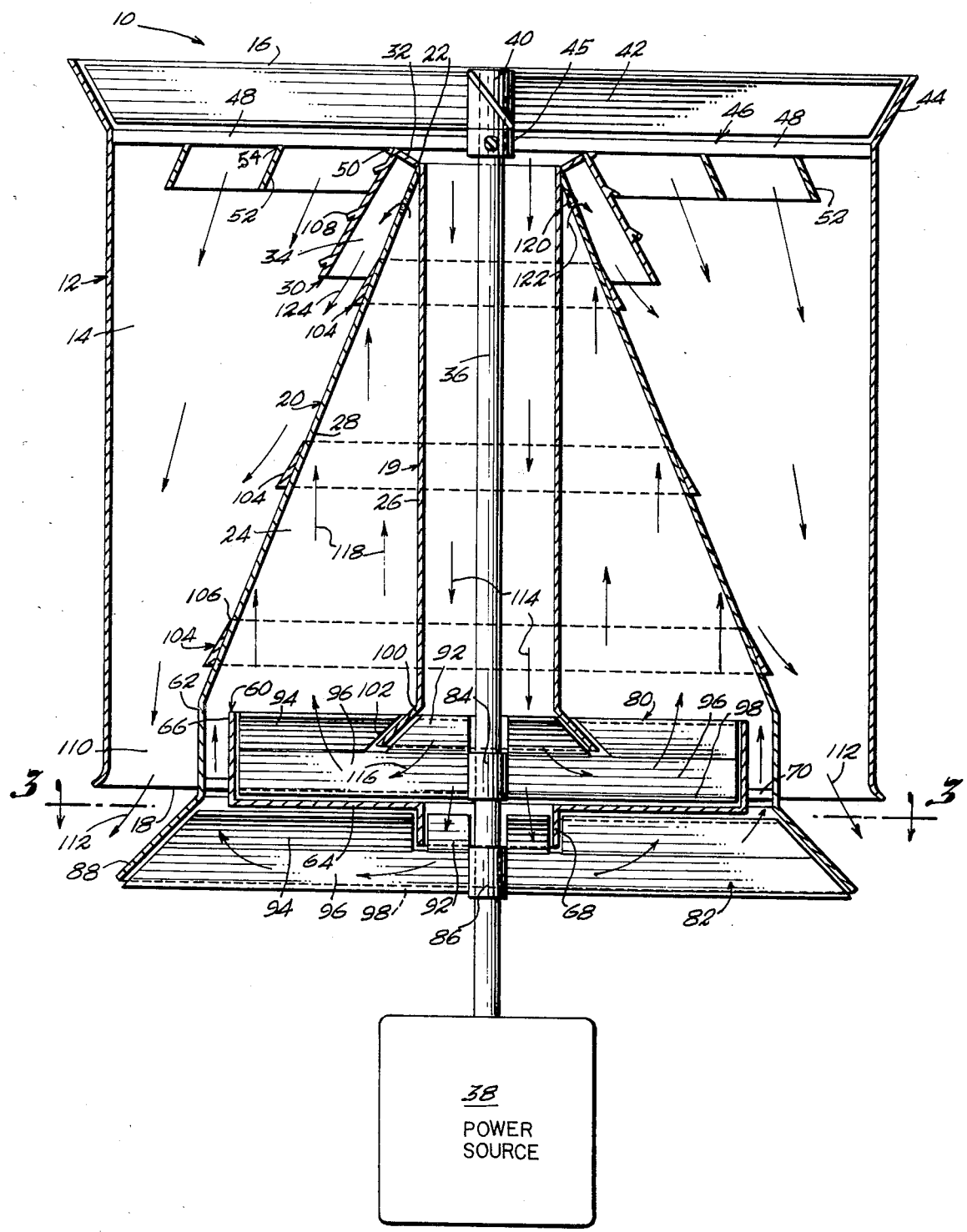
FIG. 1 is a vertical cross sectional view of the vertical lift device of the present invention.

With reference to the drawings in which like reference characters designate like or corresponding parts throughout the various views and with particular reference to FIG. 1, the vertical lift device of the present invention, indicated generally at 10, includes a main cylindrical housing 12 defining a tunnel 14 having open upper and lower ends 16 and 18. A central axially disposed tube 19 extends through the main height of the tunnel 14, said tube 19 surrounded by an axially extending truncated cone number 20. The small upper end of cone 20 is fixed as by welding at 22 to the upper end outer periphery of tube 19.

As seen in FIG. 1, a chamber 24 is defined between the outer wall surface 26 of tube 19 and the inner wall surface 28 of cone 20. A top, secondary outer truncated cone 30 of a substantially reduced height relative to cone 20, is fixed as by welding to the top connection 22 of cone 20 and tube 19 by a top closure ring 32. As illustrated in FIG. 1, the top cone 30 is circumferentially enlarged relative to the top end of cone 20 to define a chamber 34 therebetween.

A drive shaft 36 extends axially, vertically through the tube 19 from a power source 38, below the lift device 10, to a point of connection 40 to a downdraft producing propeller 42 disposed in an outwardly flared top mouth portion 44 of cylindrical housing 12. Drive shaft 36 and propeller 42 are rotatably journaled in a support bearing 45, centrally fixed relative to a support spider 46 comprised of a plurality of radially extending arms 48 fixed between the bearing 45 and the inside surface of the upper end of housing 12. The assembly of the cones 20 and 30 is fixed as by welding at 50 to the arms 48. A plurality of annular, outwardly angled, air stream directional baffles 52 are also fixed as at 54 to the underside of arms 48.

An upwardly opening annular housing 60 is fixed within the lower end of 62 of cone member 20. Housing 60 is comprised of a bottom wall 64, an annular side wall 66, spaced inwardly of the main cylindrical housing wall 12 and a central, axially downwardly opening tubular portion 68. A plurality of connector bars 70, fixed between the side wall 66 and the lower end 62 of cone member 20, support annular housing 60.

A pair of closely adjacent bottom fans 80 and 82 are fixed at 84 and 86 to the drive shaft 36. The uppermost fan 80 of said pair is disposed in annular housing 60 and the fan 82 is immediately therebelow in an outwardly flared lower end portion 88 of cone 20.

Figure 3:
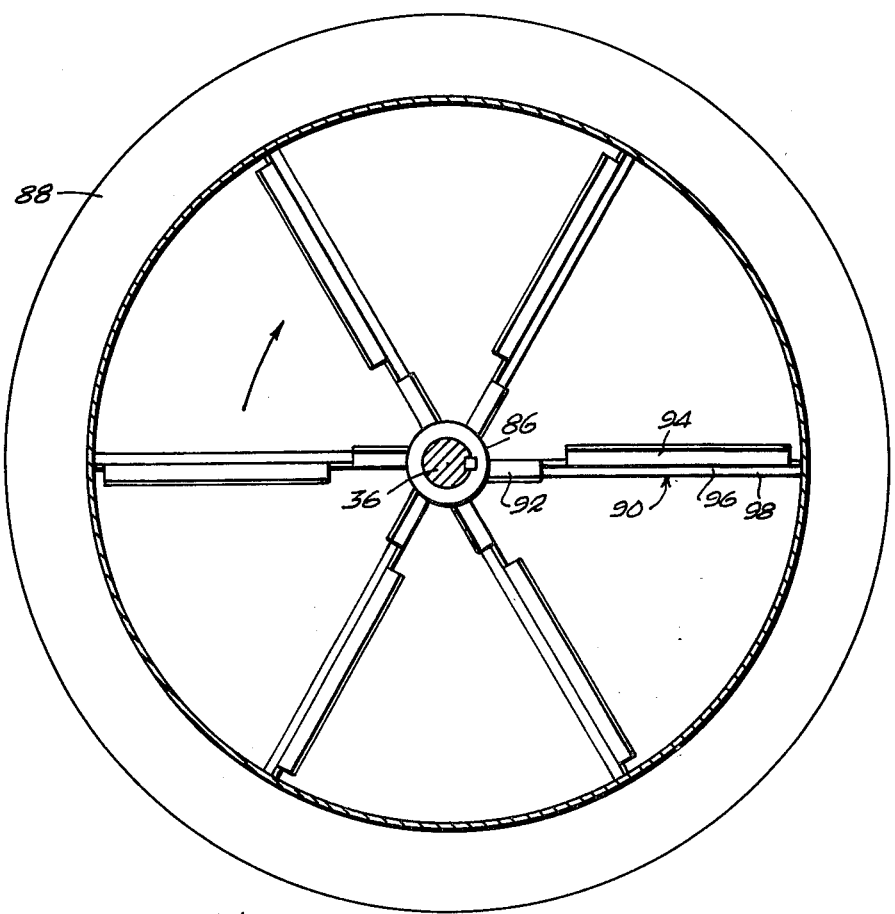
FIG. 3 is a horizontal cross sectional view taken along line 3—3 of FIG. 1.
Figure 4:
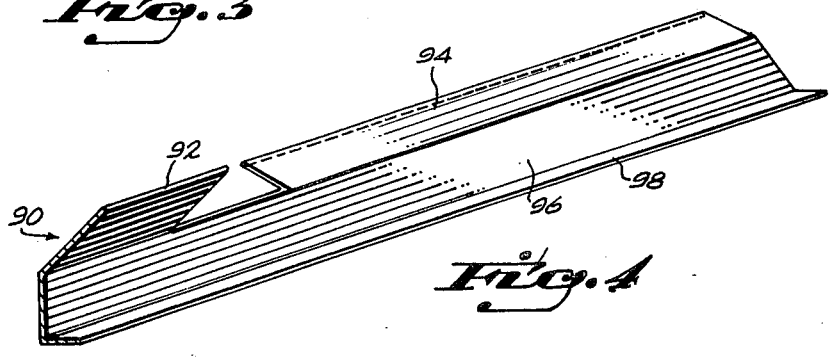
FIG. 4 is an enlarged detailed perspective view of one blade of the fan illustrated in FIG. 3.

With reference to FIGS. 3 and 4 and particularly to FIG. 4, each blade, such as 90, of both fans 80 and 82 includes a first inner portion 92, pitched in a first direction, a second, outer, reversely pitched portion 94 and a third, lower, vertically disposed portion 96, extending the entire length of the blade 90 and connecting between first and second blade portions 92 and 94. A horizontally extending flange 98 is formed along the length of the lower edge of the vertical blade portion 96.

With further reference to FIG. 1 an outwardly flared lower end portion 100 of tube 19 extends into a slot 102, defined between first and second pitched blades portions 92 and 94 of each blade of fan 80, in a separating relation therebetween. The tubular portion 68 of housing 60 serves to separate the blade portions 92 and 94 of the lower fan 82 in the same manner as above described.

Figure 2:
FIG. 2 is an enlarged side elevational view of a secondary top cone utilized in the vertical lift device.

Referring again to FIG. 1, a plurality of spaced apart rings 104 are fixed about the outer surface of cone 20. The rings 104 are wedge shaped in vertical cross section, increasing in the thickness downwardly from a top point 106. As seen in FIG. 2 a plurality of downwardly spiralling baffle ridges 108 are provided on the outer surface of the top, secondary cone 30 for a purpose to be hereinafter described.

The power source 38 may be any appropriate type of motor as illustrated, or may be comprised of a suitable power train from a remote power source.

In operation, the power source is energized to cause rotation of the propeller 42 to create a downwardly directed spiral stream of air by means of baffles 52 and spiral baffles 108. The air stream is tornado like in nature, a confined downward whirling stream of air at high velocity, and is substantially directed along and around the outer circumferential portion of tunnel 14 away from the outer wall surface of cone 20, while at the same time within cone 20 there is an upward moving force of air supplied through tube 19 by means of rotating fans 80 and 82. This arrangement causes positive lift.

A first portion of the air stream is directed through the circumferential opening 110 at the outer bottom of tunnel 14 providing a first lift force, indicated by arrows 112.

A second portion of the air stream is directed downwardly through tube 19 to the fan 80, indicated by arrows 114. Inner blade portions 92 of blades 90 thereof are pitched to direct a stream of air downwardly for radial movement across the vertical blade portion 96, indicated by arrows 116. Reverse pitch blade portions 94 thereafter direct the air stream upwardly as indicated by arrows 118 to create a second lift force in the cone chamber 24 against the inner cone walls 28.

A portion of the air pressure in cone chamber 24 escapes through a pluralty of annularly spaced ports 120, disposed about the top portion of cone 20 as indicated by arrows 122. The escaping air passes outwardly through chamber 34 for downward passage through tunnel 14 as indicated by arrows 124. As further indicated by arrows 124, the escaping air stream is directed outwardly away from the outer surface of cone 20 by the wedge shaped rings 104. In this manner the air pressure forces against the outer surface of cone 20 are kept to a minimum, thereby maximizing the lift effect of the high pressure forces in cone chamber 24.

While one preferred form of the invention has been disclosed, it will be obvious to anyone skilled in the art that various changes and modifications can be made therein without departing from the true spirit of the invention as defined in the appended claims.

I claim:

1. A vertical lift device comprising,
   a main cylindrical housing defining a vertically extending tunnel having open top and bottom ends,
   a tube, extending axially through the main control height of said tunnel and having upper and lower open ends,
   an axially disposed main truncated hollow cone in said tunnel having a relatively small open upper end and an enlarged open lower end, said cone being disposed about said tube, defining an inner conical chamber between an inside wall surface of said cone and an outside wall surface of said tube, said cone and tube open upper ends being fixed relative to each other inwardly of said tunnel open top end,
   means to fixedly support said tube and cone in said tunnel,
   a drive shaft, extending axially upwardly through said tube,
   a downdraft producing propeller disposed in said tunnel open top end and being fixed to said drive shaft above said tube open upper end,
   fan means disposed in said enlarged open lower cone end and being fixed to said drive shaft,
   a power source operably connected to an outwardly extended end of said drive shaft to operate said propeller and said fan means, said propeller thereby creating an air stream having a first air stream portion passing downwardly through said tunnel outwardly of said cone and out through said tunnel open bottom end, to create first lift forces and a second air stream portion passing downwardly through said tube.
   said fan means having blade means positioned to intercept said second air stream portion at said tube open lower end and to divert it upwardly into said conical chamber to create second lift forces.

2. The vertical lift device as defined in claim 1 wherein said means to fixedly support comprises a spider fixed adjacent to said open top tunnel end with a central fixed journal bearing for said drive shaft, said tube and cone being fixed as by welding at their upper ends to said spider.

3. The vertical lift device as defined in claim 2 including a top, secondary, truncated cone fixed relative to the top end of said main cone, said secondary cone being of a substantially reduced height relative to said main cone and circumferentially enlarged relative thereto to define a bottom opening chamber therebetween.

4. The vertical lift device as defined in claim 3 including a first baffle means, fixed to said spider, and extending downwardly from and outwardly angled relative thereto, and a second baffle means comprised of a plurality of downwardly spiralling ridges on the outer surface of said secondary cone.

5. The vertical lift device as defined in claim 1 wherein said fan means comprises a pair of vertically adjacent fans, each of said fans having blade means, said blade means comprising a plurality of equally spaced, radially outwardly projecting impeller blades.

6. The vertical lift device as defined in claim 5 wherein each blade comprising a first, inner portion pitched in a first direction, a second, outer, reversely pitched portion and a third, lower, vertically disposed portion, extending the length of said blade and interconnecting said first and second blade portions.

7. The vertical lift device as defined in claim 6 including a horizontally extending flange formed along the length of the lower edge of said vertical blade portion.

8. The vertical lift device as defined in claim 3 including a plurality of annularly spaced ports opening through the top end portion of said main cone adjacent said top end thereof.

9. The vertical lift device as defined in claim 8 including a plurality of spaced apart wedge shaped horizontal rings fixed about the outer surface of said main cone.

* * * * *